ated Feb. 29, 1972

United States Patent Office 3,645,945
Patented Feb. 29, 1972

3,645,945
ASPHALT COMPOSITION
Sherman D. Lesesne, Georgetown, and George P. Speranza, Austin, Tex., assignors to Jefferson Chemical Company, Inc., Houston, Tex.
No Drawing. Filed Feb. 15, 1967, Ser. No. 616,156
Int. Cl. C08g 51/52
U.S. Cl. 260—28
2 Claims

ABSTRACT OF THE DISCLOSURE

The ductility and the elasticity of an asphalt composition is improved by the in situ formation therein of a polyurethane polymer from added polyol and organic polyisocyanate components. These resultant improved asphalt compositions are desirable for paving surfaces, roofing applications, soil stabilization, sealants and other applications wherein elasticity and ductility are important. The improved asphalt composition exhibits excellent heat stability after being held at high temperatures for an extended period of time.

BACKGROUND OF THE INVENTION

Field of the invention

This invention relates to the improvement of the ductile and elastic properties of asphalt.

Description of the prior art

The use of asphalt to stabilize soils is well known and has been practiced for many years. In the early days of the oil industry, crude oils and asphalts were poured on roads to keep down dust and to make roads more passable in times of adverse weather conditions. Even today in rural areas, in many instances the soil of dirt roads is stabilized through the addition of asphalt to the surface. Likewise, asphalt soil stabilization is important in the retention of moisture in sandy soils for farming purposes in that it aids in the retention of moisture in the topsoil in the vicinity of the surface where the roots of farm crops seek nourishment.

The use of asphalts in the preparation of roadbeds and paving surfaces is also well known. In paving applications, asphalt is usually added to or mixed (as a binder) with a granulated mineral aggregate to form the topmost surface which is subject to the wear of traffic and the abuses of climatic conditions and weather changes. In the use of asphalt in this application, there are many problems which need solution in order to produce an economical and wearable surface. One of the most critical problems facing those employing the asphalt binder in the preparation of a surface such as a road or parking lot is the high susceptibility to oxidation and hardening of the asphalt.

Hardening is caused by oxidation and volatilization of the lighter components of the asphalt. One instance contributing to hardening occurs when an asphalt composition is heated to its mixing or pouring temperature for use as a binder for the mineral aggregate forming the surface to be paved. The length of time that the asphalt may be held at elevated temperatures constitutes what is known as "pot life." Heretofore, pot life has been short due to volatilization of lighter components and resulting hardening of the asphalt surface. Our invention lengthens this pot life, making it possible to maintain the asphalt composition at elevated temperature for several days without harm. Oxidation occurs by the interaction of air upon the pavement after it has been laid, said oxidation being increased if the paving surface is porous or not uniform. When the oxidation occurs, causing the consequent hardness of the asphalt binder, continued traffic passing over the asphalt will cause it to become eroded and subsequently to fail, requiring the resurfacing of the eroded area.

The chemical composition of asphalt is quite complex, and the practice of the art has been to reduce the classification of the asphalt components to several general classes rather than attempting to analyze asphalts exhaustively for their individual constituents. See, for example, U.S. Pats. 3,046,149 and 3,068,168. Generally, the components are broken down into asphaltenes, resins and oils. It is known, however, that the components of asphalt have wide range of boiling points and differing degrees of unsaturation in both cyclic and linear hydrocarbons. It is further known and understood that these compounds have differing boiling points, and hence the elevation of temperature causes a volatilization of some of the lighter fractions. When these lighter fractions are volatilized, the asphalt becomes harder and produces a less satisfactory aggregate binder in a paving composition. In addition, the increase in temperature in presence of air causes the asphalt composition to oxidize, further reducing the ductility and elasticity of the composition. It is this combination of results which makes it necessary that the paving composition be held at elevated temperature for shorter periods of time, which has a resultant loss in the efficiency of the work crews when it becomes necessary to reheat the asphalt composition prior to applying it to the aggregate.

SUMMARY OF THE INVENTION

This invention relates to improving the elasticity and ductility properties of asphalt compositions. In so doing it increases the pot life of a heated asphalt and provides a more uniform and less porous surface when used as a paving component. More particularly, it involves the accomplishment of said improvement by the incorporation in an unmodified asphalt composition of a polyether polyol component and an organic polyisocyanate component in order to form a reaction product within the asphalt composition by chemical reaction of said components therein. We have discovered that when this practice is followed, the resulting improved modified asphalt composition is more ductile and more elastic than the asphalt composition without said polyurethane polymer incorporated therein. The ductility of said modified asphalt composition is determined by following the standard method of test for the ductility of bituminous materials (ASTM designation: D113–44) with the elastic properties of said composition being determined by the measurement of and comparison of the diameters of the threads of the various test samples after the ductility test has been run.

In the scope of our invention the term "unmodified asphalt" may, but not necessarily, include cutback agents, emulsifiers, adhesive agents, and other additives for specialty uses of asphalt compositions.

By practicing the method of our invention, an improved modified asphalt composition is produced which will be more uniform, elastic and ductile and at the same time less susceptible to oxidation. In fact, we have discovered that when our improved modified asphalt composition is prepared, it may be held for extended periods of time at high temperatures without becoming unduly hard and brittle. This extended pot life is quite advantageous to the economic application of the binder to the mineral aggregate in the manufacture and paving of surfaces in that it allows the work crews to maintain the operating temperature of the asphalt composition over a weekend without detrimental effect to said composition, thus eliminating the necessity on the morning after weekends of having to heat up the asphalt mixture again prior to applying it to the surface to be paved.

We have discovered that the practice of our invention can reduce the susceptibility to hardening of the asphalt composition, which results in a more ductile and elastic binder, which in turn produces a more uniform and longer wearing surface. While it is to be understood that we are not to be bound by the following theory, it is believed that by incorporating the polyol and isocyanate components of the polyurethane in the asphalt, the resulting reaction forming the polyurethane polymer also includes some of the active groups which are present in the asphalt itself. We have found that merely incorporating a finished polyurethane polymer in the asphalt is not sufficient to give this desired result in that polyurethane polymers cannot be readily mixed with heated asphalt.

In the past, oxidation and volatilization of the asphalt components have been reduced by attempting to keep air out of the mixer or storage tank for the heated asphalt or by attempting to blanket it with an inert gas. However, little protection could be offered to the asphalt against oxidation during the laying and compaction of the finished road or other surface and oxidation of the asphalt films by air penetrating into the pavement. Thus, it was necessary to formulate a composition which gives a uniform nonporous surface to assure minimum hardening of the asphalt during service and also one which would reduce the susceptibility of the asphalt to oxidation and hardening during the stage of preparation of the asphalt composition for the pavement surface. We have discovered a new method for reducing this oxidation and volatilization, while at the same time providing a uniform, nonporous surface with improved elastic properties.

In the practice of our invention the paving asphalt is heated to the temperature at which it is to be applied to the aggregate in the roadbed or to be mixed with aggregate in a pug mill for application as a finished mat. The temperature to which the composition is heated prior to application depends upon a number of factors, such as the penetration rating of the asphalt, the aggregate being used, the ambient temperature and the method of application whether it be in mixture with the aggregate or applied to an aggregate which has already been distributed over the roadbed. Where the aggregate is mixed in a pug mill, the asphalt representative temperature will vary from about 170° to about 200° F., and where the granulated aggregate is placed on the roadbed prior to the addition of asphalt, the temperature of said asphalt will generally fall in the range of 275° to about 350° F. In either event, the practice of our invention improves the elastic and ductile properties of asphalt compositions regardless of temperature at which it is used.

It is during this heating process that the polyol component (usually polyether polyol) and the organic polyisocyanate component of the polyurethane polymer are added to the asphalt. The rate at which the reaction takes place depends upon the temperature at which the components are added, and therefore the time necessary for the improvement to take place will, of course, vary. The addition of these polyurethane components can conveniently be made in the field at the work site or wherever it is most convenient to add the said components. It is also relatively simple to determine when the reaction has taken place through the expedient of merely touching a stick or a rod to the surface of the asphalt and drawing threads therefrom. It is possible to determine visually the change taking place in the asphalt by observing the change in the thickness of the thread which is drawn when the stick or rod is removed from the surface of said asphalt. After the thread diameter ceases to increase, then the operator can determine that the reaction is complete. Moreover, it is not absolutely necessary that the reaction and curing process has become totally complete prior to combining the asphalt composition with the aggregate to form the pavement surface, as the reaction will continue without detriment to the final composition.

As use herein, the term "polyether" is intended to include linear and branched polyethers having at least one and preferably a plurality of ether linkages and containing at least two hydroxyl groups. Preferred polyethers are the polyoxyalkylene polyols. Among the polyoxyalkylene polyols useful in the practice of this invention are the polyethylene glycols and polypropylene glycols having average molecular weights of greater than 2,000. Polymers and copolymers of polyoxyalkylene polyols are also adaptable in the process of this invention. Among the copolymers of polyoxyalkylene polyols, and particularly propylene oxide, that deserve some special mention are the propylene oxide adducts of polyhydric alcohols having from 2 to 22 carbon atoms, such as ethylene glycol, glycerol, 1,2,6-hexanetriol, trimethylolpropane, trimethylolethane, pentaerythritol, sorbitol, triethanolamine, triisopropanolamine, ethylenediamine, diethylenetriamine, ethanolamine and phenol formaldehyde condensate having the following formula:

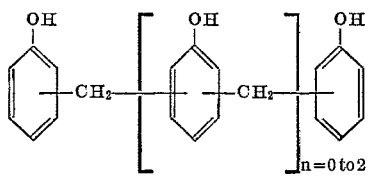

Preferred copolymers of propylene oxide and ethylene oxide are those containing 5 to 20 mol percent ethylene oxide and having molecular weights of 2,000 to about 20,000.

The polyoxyalkylation reaction may be performed in a manner such that either block or heteric copolymers or both are obtained. A block polymer of ethylene oxide or propylene oxide is formed when the epoxides are added sequentially, whereas the heteric polymer is formed where the ethylene oxide and propylene oxide are mixed together and reacted with the initiator simultaneously.

The higher functional initiators that are useful with the alkylene oxide include polyols, polyamine and amino alcohols having a total of three of more reactive hydrogen atoms on hydroxyl groups and primary or secondary amino groups. Suitable polyols include triols, such as glycerol trimethylolpropane, butane triols, hexane triols, trimethylolphenol, trialkanolamine; various tetrols, such as erythritol and pentaerythritol; pentols; hexols, such as sorbitol; and polyoxyalkylated derivatives of polyfunctional compounds having three or more reactive hydrogen atoms, such as, for example, the reaction product of trimethylolpropane, glycerol and other polyols with ethylene oxide, propylene oxide or other epoxides or copolymers thereof; e.g., copolymers of ethylene and propylene oxide. Higher functional amino alcohols and polyamines include by way of example, ethanolamine, diethanolamine, triethanolamine, isopropanolamine, diisopropanolamine, triisopropanolamine, 2 - (2 - aminoethylamino)ethanol, 2-amino-2-(hydroxymethyl)-1,3-propanediol, diethylenetriamine, triethylenetetramine, urea and urea-formaldehyde polymers, as well as various aryl polyamines, such as aniline formaldehyde condensate having the following formula:

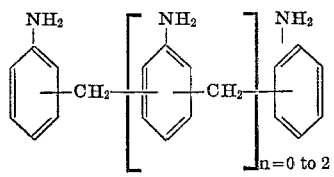

Preferred polyethers of the branched type are those prepared by adding propylene oxide to various diols, triols or tetrols as initiators to produce adducts of various molecular weights. Polyethers which deserve special mention are then trimethylolpropane, 1,2,6-hexanetriol and glycerol adducts of propylene oxide having molecular weights of 2,000 to about 20,000. Further useful types of polyethers in the process of this invention are block copolymers prepared from propylene and ethylene oxide with the above-described higher functional initiators.

The polyethers suitable for employment in the process of this invention can be conveniently characterized as normally liquid, pourable polyethers having molecular weights in the range of from 2,000 to about 20,000. To produce the most advantageous polyurethane elastomers in the asphalt, the polyether polyol molecule must have a long chain between the hydroxyl groups. In order to prevent excessive cross-linking in said elastomers, the polyol component must have a high equivalent weight of 1,000 to about 6,000.

In conventional polyurethane reactions, appropriate catalysts are employed. While not necessary to the practice of our invention, such catalysts may be used to increase reaction rates. Some catalysts used are the organic tin catalysts having a direct carbon to tin valence bond and at least one catalytically intensifying bond from said tin to halogen, oxygen, sulfur, nitrogen or phosphorus, such as tributyltin hydroxide, dibutyltin diacetate, octyltin tris(thiobutoxide), dilauryltin oxide and dibutyltin dilaurate. These organic tin catalysts are more completely disclosed in U.S. Pats. Nos. 3,194,773 and 3,084,177, for example. Other suitable catalysts for urethane reaction are N-alkylmorpholine and tertiary amines, such as trialkylamines and dialkyl aminoalcohols as further disclosed in U.S. Pat. No. 2,650,212. Triethylenediamine is also suitable as a polyurethane catalyst (U.S. Pat. 2,939,851, for example). The foregoing is merely illustrative of some of the suitable catalysts which may be used in the practice of our invention; however, we reiterate that no catalyst is necessary to produce the improved composition of this invention.

DESCRIPTION OF THE PREFERRED EMBODIMENTS

As disclosed above, our invention involves the incorporation in an unmodified asphalt of polyether polyol organic polyisocyanate components with or without a catalyst, probably so that the components comprise 0.5–7 wt. percent, based on the unmodified asphalt. The reaction product of these components, the polyurethane polymer, is cured or partially cured within said asphalt prior to its application to a granulated mineral aggregate on a roadbed or in a pug mill where it is mixed with said aggregate prior to being applied as a paving surface to said roadbed.

The polyols suitable for use in the practice of this invention include hydroxy-terminated polymers, such as polybutadiene diol and polyether diols, triols, mixtures thereof and mixtures of said polyether diols and polyether triols with higher functionality polyether polyols such that the resulting polyol used has a functionality from 2 to about 4. (Throughout our specification, where the term "functionality" is used, it is understood to be defined as "average functionality.") To produce advantageous polyurethane elastomers in the asphalt, the polyol molecule must have a long chain between the hydroxyl groups. This means the polyol must have a high equivalent weight of 1,000 to about 6,000. This is necessary to prevent excessive cross-linking in the polyurethane which destroys the advantageous elastic properties desired. However, if the polyol component is a hydroxy-terminated diol prepared from polybutadiene the equivalent weight may range from about 500 to about 6,000.

The organic isocyanates useful in the practice of our invention are polyaryl polyisocyanates, such as, for example, diphenyl diisocyanate, triphenyl diisocyanate and 4,4'-, 2,2'-tetraisocyanato diphenyl.

The preferred organic isocyanates used in the practice of our invention are 2,4'-diisocyanato diphenylmethane and 4,4'-diisocyanato diphenylmethane and mixtures thereof and polymers thereof. These polyaryl polyisocyanates are produced through the catalytic condensation reaction between aniline and formaldehyde with a subsequent phosgenation to produce the isocyanate. The results of this reaction produce a crude polyisocyanate mixture having, in combination, the following isocyanate structures:

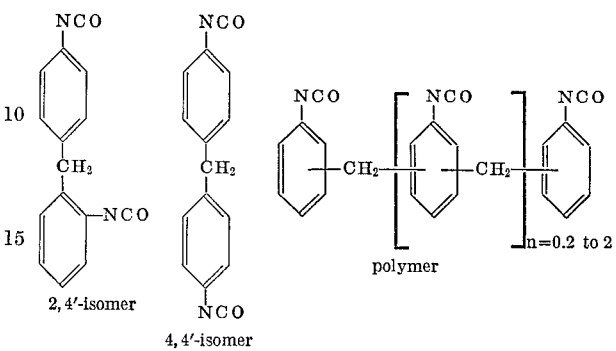

Crude polymeric isocyanate mixtures of this type are readily available commercially and perform quite well in the practice of our invention.

It is understood that the practice of our invention involves the use of either the dimer or the polymer or mixtures thereof. It is a preferred practice of our invention, however, to use the polymeric isocyanates with a functionality of from about 2.2 to about 4. Through the use of the polymerics, hazards due to vapor toxicity are lessened, and the overall cost of the operation is reduced without a subsequent loss in the advantages in improved ductility and elasticity in the asphalt composition. The monoaryl isocyanates, well known in the urethane art, such as toluene diisocyanates are unsatisfactory for the practice of our invention.

In the selection of the polyol and the isocyanate components to practice the method of this discovery, the combined functionality of said polyol component and said isocyanate component should be from 4 to about 8 with the ratio of isocyanate groups to hydroxyl groups from about 0.8:1.0 to about 1.2:1.0. An especially preferred combination of polyol and polyisocyanate in the practice of this invention would be the addition of a polyoxyalkylate adduct of a triol, such as glycerol, trimethylolpropane, or 1,2,6-hexanetriol with an equivalent weight of about 2,000–4,000 to a crude polymethylene polyaryl polyisocyanate reaction product having a functionality of from 2.2–3.0 and an equivalent weight of about 134, the total functionality being about 5.2–6.0. These components are added such that the isocyanato/hydroxyl ratio is within the range of 0.8/1.0 to about 1.2/1.0 and comprises from 0.5% to about 7% by weight of the asphalt based upon the untreated asphalt. We have found that this resulting composition produces a highly ductile and an elastic composition as shown by the subsequent examples.

Catalysts, such as the examples previously described herein, are often added in the usual polyurethane reaction. While catalysts may be added to speed the reaction in curing of the asphalt-polyurethane composition, it is not necessary, for we have discovered that the elastic and ductile properties of the asphalt are improved without the necessity of adding catalysts to said polyurethane asphalt composition. Instead, we have found that when the polyol and isocyanate components are stirred into the melted asphalt at a temperature between 100° and 125° C., the alteration normally begins in about 15 minutes without the aid of the catalyst. This alteration may be observed by putting a drop of asphalt with the components added on a piece of paper and drawing out threads of the modified composition. One following this simple procedure will note that the thickness and the elasticity of the thread will change, indicating that the reaction is taking place and is modifying the asphalt-polyurethane composition. Stirring continues at this temperature for about 30 minutes and then is increased to 150° to 160° C. and stirring continued for two hours. Tests run to determine the elasticity, ductility and penetration indicate that a greatly improved asphalt composition results. We have maintained said composition at about 125° C. (257° F.) for extended periods of time up to about 72 hours and have seen no degradation in the asphalt-polyurethane composition.

Should those skilled in the art desire to increase the reaction rate of the components in the asphalt, it is within the scope of this invention to add a urethane reaction catalyst to the mixture.

In the examples which follow, the ductility of the asphalt and asphalt polyurethane combinations was determined using the standard ASTM Test (D113–44). The ductility of a bituminous material is measured by the distance to which it will elongate before breaking when two ends of a briquet specimen of the material are pulled apart at a specified speed and at a specified temperature. In evaluating the composition of our invention, both the low temperature test (4° C.) and the standard temperature (25° C.) test were used. The standard temperature test is conducted at a speed of five centimeters per minute, while the low temperature test is performed at a rate of pull of one centimeter per minute while the molded test specimen built according to the specification in the test is contained in a water bath held at the specified test temperature. In all of the following examples the standard ASTM method was followed. In determining the penetration of the particular asphalt compositions, the ASTM Test D–52 procedure was followed. Penetration is defined as the consistency of a bituminous material, expressed as the distance that a standard needle penetrates vertically into a sample of the material under known conditions of loading, time and temperature, said conditions being a load of 100 grams for five seconds at 25° C. The units of penetration are hundredths of a centimeter. In this test, as in the ductility test above, the sample is made according to the specification set out in the test procedure.

The results of the test and the examples which follow were performed on an asphalt having a penetration of about 135, which is within the range generally acceptable for paving applications. It is understood, however, that this is purely illustrative and in no way limits the scope of our invention, for one skilled in the art can readily determine, by using our disclosure, equivalent applications to other asphalts.

EXAMPLE I

To a 2,000 gram sample of unmodified melted OA-135 asphalt was added 53.2 grams of a hydroxy-terminated polybutadiene diol (prepared from butadiene and hydrogen peroxide) having an average molecular weight of 2,200 and an OH functionality of 2.1, and 6.8 grams of crude commercial polymethylene polyphenol polyisocyanate having an equivalent weight of 135 and a functionality of 2.88. The mixture was stirred vigorously with a two-inch propeller stirrer in a one-gallon can at 100° to 125° C. for 30 minutes, then at 150° to 160° C. for two hours. The asphalt-polyurethane composition was ductile and elastic, while the original asphalt showed only slight elastic properties. When the original and the modified asphalt were given a standard ductility test at 25° (ASTM Test. No. D113–44), the diameter of the modified thread, after elongation under test conditions, was ten times the diameter of the thread of the original asphalt. Table 1 presents a quantitative comparison of these results. At 4° C. there was a 300% improvement in elongation before breaking occurred, illustrating low temperature improvement.

TABLE 1

| Test No. | Percent by wt. poly-urethane | Ductility | | | Penetration, 1/100 cm., 25° C. | Remarks |
|---|---|---|---|---|---|---|
| | | Temp., °C. | Length, cm. | Thread diameter, mm. | | |
| 48 | 0 | 25 | 150+ | <0.1 | 135 | Very fine thread. |
| 38 | 3 | 25 | 150+ | 1.0 | 131 | Thick, even strand (NCO/OH=1.0). |
| 29 | 0 | 4 | 17 | <0.1 | 135 | Very fine thread. |
| 82 | 3 | 4 | 53 | | 136 | |

EXAMPLE II

This example illustrates the improvement in heat stability and extended pot life of our asphalt composition when held for an extended time at high temperatures. Tests were run following the procedure outlined in Example I using the same polyol/polyisocyanate combination, except that in one instance the resulting polyurethane comprised only 1.5% by weight of the composition. These two improved asphalt compositions were held at 125° C. (257° F.) for 72 hours. After this time the ductility and penetration tests were run. As can be seen by the results in Table 2, the samples exhibited good ductility and penetration and could be drawn into a thick thread.

TABLE 2

| Test No. | Percent by wt. poly-urethane | Ductility | | | Penetration, 1/100 cm., 25° C. | Isocyanate/ hydroxyl ratio |
|---|---|---|---|---|---|---|
| | | Temp., °C. | Length, cm. | Thread diameter, mm. | | |
| 72 | 1.5 | 25 | 150+ | 0.3 | 120 | 1.1 |
| 73 | 3 | 25 | 150+ | 0.3 | 140 | 1.1 |

EXAMPLE III

In this series of tests the procedure of Example I was followed except that the polyol component (a polyoxy-alkylated adduct of trimethylol propane having a molecular weight of approximately 6,500 and a functionality of about 2.5) was added to the heated asphalt along with the polyisocyanate component (a crude commercial polymethylene polyphenyl polyisocyanate having the equivalent weight of 135 and a functionality of 2.88) to form a composition of varying polyurethane content. See Table 3 for the results of these tests, noting especially the improvement in the thread diameter when the ductility test is run.

The increase in the thread diameter indicates that there is modification of the asphalt by the polyurethane forming reaction which has occurred therein. Note also that the penetration has increased, indicating that the improved asphalt composition is softer and, hence, longer wearing when used as the binder in a paving surface.

TABLE 3

| Test No. | Percent by wt. polyurethane | Ductility Temp., °C. | Length, cm. | Thread diameter, mm. | Penetration, 1/100 cm., 25° C. | Remarks |
|---|---|---|---|---|---|---|
| 48 | 0 | 25 | 150+ | 0.1 | 136 | Very fine thread. |
| 59 | 1.5 | 25 | 150+ | 2.0 | 140 | Very uniform thick thread. |
| 61 | 3 | 25 | 150+ | 3.0 | 155 | Thick thread. |

What is claimed is:

1. In a method for preparing an improved modified asphalt paving composition by heating unmodified asphalt, adding thereto emulsion or cutback agents and adhesive agents and applying said composition to a mineral aggregate, the improvement which comprises incorporating in said unmodified asphalt, prior to applying said composition to said mineral aggregate, 0.5 to about 7 wt. percent, based upon said unmodified asphalt, of a polyol component having an equivalent weight from 1,000 to about 6,000 with a functionality of from 2 to about 4 and a polyaryl polyisocyanate component with a functionality of 2.2 to about 4 and the combined functionality being no greater than 8.

2. In a method for paving a road wherein a granulated mineral aggregate is combined with an asphalt binder and applied to the surface to be paved, the improvement which comprises incorporating within said asphalt binder a polyol component having an equivalent weight of from 1,000 to about 6,000 and a functionality of 2 to about 4 and a polyaryl polyisocyanate component having an equivalent weight of about 135 and a functionality from 2.2. to about 4; which reaction product produces a polyurethane polymer incorporated in said asphalt binder wherein the combined functionality of said polyol component and polyisocyanate component is from 4.2 to about 8 and said polyurethane polymer comprises from about 0.5 to about 7 wt. percent based upon the weight of the unmodified asphalt.

References Cited

UNITED STATES PATENTS 3,179,610    4/1965    Wood _____ 260—28

MORRIS LIEBMAN, Primary Examiner

P. R. MICHL, Assistant Examiner

U.S. Cl. X.R.

94—20